United States Patent
Babcock et al.

[15] 3,657,987

[45] Apr. 25, 1972

[54] SELF-BALANCING APPARATUS FOR PHOTOGRAPHIC CAMERAS

[72] Inventors: David L. Babcock; David B. Lederer, both of Rochester, N.Y.

[73] Assignee: Eastman Kodak Company, Rochester, N.Y.

[22] Filed: Oct. 27, 1970

[21] Appl. No.: 84,389

[52] U.S. Cl. ............................................95/64 D, 95/10 CD
[51] Int. Cl. ........................................G03b 7/08, G03b 9/04
[58] Field of Search ..................95/10 C, 10 CD, 64 R, 64 D

[56] References Cited

UNITED STATES PATENTS

| | | | |
|---|---|---|---|
| 3,427,941 | 2/1969 | Metzger | 95/10 CD |
| 3,511,145 | 5/1970 | Ort | 95/10 CD |
| 3,539,252 | 11/1970 | Gleason, Jr. | 95/64 R |

*Primary Examiner*—Joseph F. Peters, Jr.
*Attorney*—Robert W. Hampton and Raymond L. Owens

[57] ABSTRACT

A self-balancing exposure control apparatus is disclosed which includes a diaphragm defining a first aperture disposed in a cooperative relation with a camera lens and a second aperture disposed in a cooperative relation with a photosensitive device having a parameter which varies as a function of incident illumination. The apparatus includes a control circuit which responds to variations in the parameter to move the diaphragm to adjust the effective size of the respective apertures to return the level of illumination incident on the photosensitive device to a predetermined level wherein the circuit is balanced and pass sufficient light to the camera lens for suitable film exposure. With decreasing scene brightness, the control circuit causes the diaphragm to increase the effective size of both apertures until the camera lens aperture reaches a size which corresponds to the maximum light transmitting capability of the camera lens. If the scene brightness continues to decrease, the size of the camera lens aperture will be maintained at the maximum size while the photosensitive device aperture will continue to increase in size to return the illumination incident on the photosensitive device to the predetermined illumination level.

13 Claims, 2 Drawing Figures

PATENTED APR 25 1972 3,657,987

DAVID L. BABCOCK
DAVID B. LEDERER
INVENTORS
Raymond L. Owens
BY Robert W. Hampton

ATTORNEYS 3,657,987

SELF-BALANCING APPARATUS FOR PHOTOGRAPHIC CAMERAS

CROSS-REFERENCES TO RELATED APPLICATIONS

Reference is made to commonly assigned copending U.S. Pat. application Ser. No. 70,981, entitled "Indicating Apparatus for Exposure Control Apparatus" filed Sept. 10, 1970 in the name of Richard C. Painton.

BACKGROUND OF THE INVENTION

The present invention relates to exposure control apparatus for cameras, and more particularly to exposure control apparatus of the self-balancing type.

It is fairly common practice at the present time to provide cameras, both "still" and "movie," with automatic exposure control means which serve to constantly adjust the camera lens aperture as a function of scene brightness. In this way the desired amount of light is constantly made available to the film regardless of variations in scene or ambient brightness. Such automatic exposure control means have proven invaluable to photographers, amateur and professional alike, since their use contributes in a major way to obtaining good quality pictures, and the user is relieved of a precise operation previously required on his part when taking pictures.

There have previously been proposed exposure control apparatus of the self-balancing type which include a photocell having an electrical parameter which varies as a function of scene illumination, a diaphragm member having an exposure control aperture and an aperture cooperative with the photocell, and adapted to be movable to adjust the size of both apertures, and a transducer driven in respective opposite directions by drive coils controlled by circuitry, such as a differential amplifier, which is responsive to variations in the photocell parameter to move the diaphragm to adjust the size of both apertures, whereby light available for film exposure is controlled.

While this and other similar types of automatic exposure control means have provided generally satisfactory results, they often result in "hunting" during variations in scene brightness.

SUMMARY OF THE INVENTION

In accordance with a disclosed embodiment of the invention, there is provided a self-balancing exposure control apparatus for cameras, which includes a movable diaphragm defining a first aperture cooperative with the camera objective lens and a second aperture cooperative with a photosensitive device having a parameter which varies as a function of incident illumination; and a control circuit responsive to variations in the parameter to move the diaphragm to change the effective size of respective apertures so as to return the illumination received by the photosensitive device to a predetermined level wherein the circuit is balanced and pass sufficient light to the objective lens for suitable film exposure. The first and second apertures are relatively shaped whereby as scene brightness decreases, movement of the diaphragm will continue to increase the effective size of the photosensitive device aperture after the camera lens aperture has reached a size which corresponds to the maximum light transmitting capability of the camera lens. With this arrangement, the control circuit can become balanced during a level of low scene illumination which is still sufficient to permit suitable film exposure, notwithstanding the fact that the maximum light transmitting capability of the objective lens had previously been reached. The apparatus also includes electrically operative indicating means which when the scene brightness is unsuitable for film exposure are energized to warn an operator not to expose any more film.

An important feature of the invention is that if the control circuit should cause the diaphragm to "overshoot" the maximum size of the camera lens aperture, there will be no false indication that picture taking should be stopped.

The invention and its objects and advantages will become more apparent in the detailed description of the preferred embodiment presented below.

BRIEF DESCRIPTION OF THE DRAWING

The above and other objects and advantages of the present invention will become apparent from the following detailed description taken in conjunction with the attached drawings wherein.

DESCRIPTION OF THE PREFERRED EMBODIMENT

Exposure control apparatus embodying the invention may be employed in cameras of either the still or motion picture variety. Since such cameras are well known, the present description will be directed in particular to elements forming part of, or cooperating more directly with apparatus in accordance with the present invention. It will be understood that parts not specifically shown or described are selectable from those known in the art.

Figure 1:
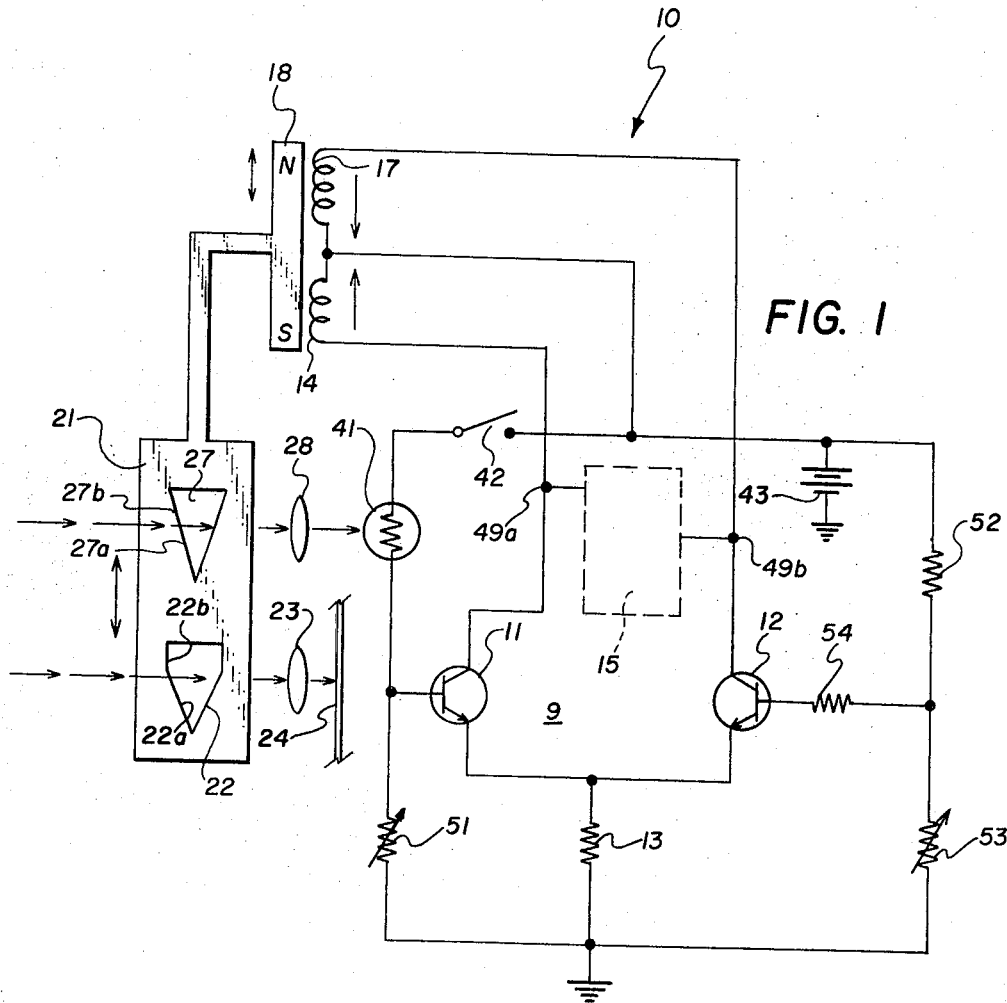
FIG. 1 is a schematic representation showing the general arrangement of an automatic exposure apparatus, as contemplated by a specific illustrative embodiment of the invention.

Turning now to FIG. 1, there is shown an exposure control apparatus 10 which includes a self-balancing control circuit 9 having a differential amplifier configuration and indicating apparatus 15 shown fully in FIG. 2 and described later in this specification. The circuit 9 is magnetically coupled to a core member 18 by means of a "close" winding 14 and an "open" winding 17. The magnetic core member 18 is moved in a downward direction when open winding 17 is energized, as subsequently described, and is moved in an upward direction when close winding 14 is energized. The core member 18 is mechanically coupled to a diaphragm 21 which as shown may take the form of an elongated plate whereby the diaphragm 21 is moved by the magnetic core member 18 in a direction, and to an extent, directly related to the movement of the core 18.

The diaphragm 21 is provided with an aperture 22 through which scene light passes to a camera or objective lens 23 to a film 24, and an aperture 27 through which scene light passes by way of a lens 28 to a photosensitive 41. The photosensitive device 41, such as a photoresistance element selected from a class in which a parameter, such as a resistance varies inversely with the intensity level of illumination instant thereon. The aperture 27 has a generally triangular configuration and will be assumed for the purpose of describing the operation of the system to have a lower tapered portion 27a and an upper tapered portion 27b. The aperture 22 associated with objective lens 23 has a triangular or tapered lower portion 22a and a rectangular upper portion 22b.

The exposure control apparatus 10 is adapted to move the diaphragm 21 back and forth in accordance with variations in scene brightness to maintain a selected level of illumination of the photocell. Considering specifically the relative shapes of the apertures 22 and 27, the rectangular portion 22b of the aperture 22 has a width corresponding to the maximum light transmitting capability of lens 23. The diaphragm 21 is movable through a first range of positions wherein the lower portion 27a of the aperture 27 and the lower triangular shaped portion 22a of aperture 22 will be positioned relative to the optical axes of lenses 28 and 23, respectively, to vary the effective sizes of the apertures relative to both lenses. The diaphragm 22 is movable through a second predetermined range of movement wherein the upper tapered portion 27b of the aperture 27 and the upper rectangular portion 22b of the aperture 22 will be disposed in cooperative relation with the lenses 23 and 28, respectively.

In operation, as the intensity of the scene brightness diminishes the diaphragm 22 moves downward and the light transmitted to each of the lenses 23 and 28 will be gradually increased if the diaphragm is in its first range of movement. As the diaphragm 22 moves in its second range of movement, the light transmitted to lens 23 will remain constant and correspond to the maximum light transmitting capability of the lens 23. As will be later described in more detail, the relative shapes of the apertures 22 and 27, which permits the diaphragm 21 to adjust the effective size of aperture 27 while maintaining the effective size of aperture 22 constant in its second range of movement, enables the control circuit to produce a null balance condition during low scene brightness conditions which are still sufficient for suitable film exposure to avoid unnecessary operation of a low light indicator lamp 47 hereinafter described.

The control circuitry for the apparatus 10 may take various forms known in the art. The circuit disclosed in commonly assigned U.S. Pat. No. 3,427,941 in the name of Lenard M. Metzger is especially suitable for use with the invention as is the circuit described in commonly assigned copending U.S. Pat. application Ser. No. 823,426 entitled ELECTROMAGNETIC AUTOMATIC APERTURE CONTROL UTILIZING A VELOCITY SENSING WINDING TO PROVIDE ACTIVE FEEDBACK VISCOUS DAMPING, in the name of Carter et al. now abandoned in favor of application Ser. No. 66,642 filed Aug. 25, 1970. To operate the circuit, a switch 42 is closed which connects a battery 43 into the control circuit 10. Two NPN transistors 11 and 12 are disposed in a differential amplifier configuration which have their emitter electrodes connected to ground through a common resistance 13. The "close" winding 14 is connected as a series element in the base collector circuit of the transistor 11, and the "open" winding 17 is similarly connected as a series element in the base collector circuit of the transistor 12. The windings 14 and 17 respectively are oppositely wound so that when energized, they will exert opposite forces on the magnetic core member 18 as indicated by the arrows in the drawing.

The differential amplifier is controlled by a resistance bridge having two arms defined by the photocell 41 and resistance element 51 respectively and the two arms defined by resistance elements 52 and 53, respectively. The bridge is balanced when illumination incident on the photocell 41 is such that the ratio of the resistance value of photosensitive device 41 to the resistance of element 51 is substantially equal to the ratio of the resistance values of the elements 52 and 53. In such condition, equal currents will pass through drive coils 14 and 17. Thus, there will be no net force tending to move the core member 18 which will be in an arrested condition. The system is calibrated such as by adjustment of the values of resistors 51 and 53 so that the bridge will be balanced when the amount of light transmitted to the lens 23 is of the desired magnitude for exposing the film 24. The selected resistance value of the photosensitive device 41 corresponds to a desired exposure setting.

If the ambient light drops below a previous level where the circuit 10 was balanced, the resistance of the photosensitive device 41 will increase thereby increasing the ratio of resistance values of elements 41 and 51 to a magnitude greater than that of elements 52 and 53 and cause the amplifier to supply additional energizing current to drive coil 17; this is effective, in turn, to cause movement of the diaphragm 21 in a "down" direction. The open winding 17 will be energized from a path leading from the battery 43, the winding 17, the collector-emitter path of transistor 11, and the resistor 13 to ground. This downward movement of diaphragm 21 is effective to "open" apertures 22 and 27, increasing the amount of light supplied to the photocell 41 and film 24 until a balanced condition is again reached.

Conversely, under conditions when the amount of light reaching photocell 41 and film 24 is greater than the previously established ideal magnitude for good quality pictures, the ratio of the resistance values of the elements 41 and 51 will then be less than the ratio of the resistance values of the elements 52 and 53 and the amplifier will then function to supply additional energizing current to drive coil 14 moving the diaphragm 21 in an upward direction. Movement in this direction will be effective to "close" apertures 22 and 27.

Assuming the diaphragm is in its second range of positions and the camera lens aperture 22 has increased to a maximum size and balancing has not yet been reached, the aperture 27 will further increase in size until balancing is reached or until the upper portion 27b of the aperture 27 is at a size wherein the maximum light transmitting capability of lens 28 is reached. In the latter case, the aperture 27 can be considered to have reached a maximum size. With the maximum light transmitting capability of the lens 28 being reached, and with scene brightness further diminishing, the potential difference between a terminal 49a (at the electrical junction between the coil 14 and the collector of the transistor 11) and a terminal 49b (at the electrical junction between the coil 17 and the collector of the transistor 12) will increase until a level is reached whereby the indicating apparatus 15 is activated to provide a conductive path from the battery 43 to energize the low light lamp 47.

Figure 2:
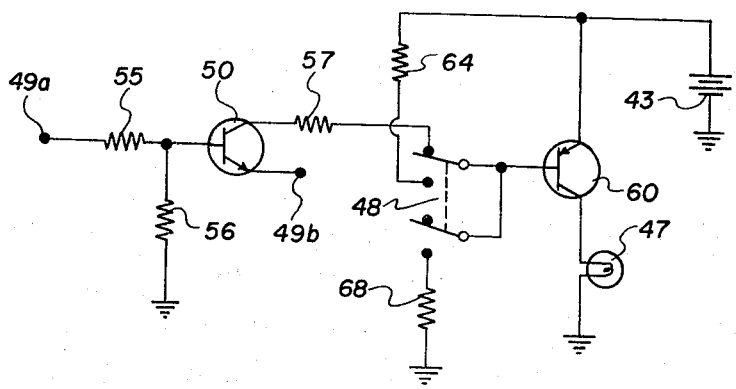
FIG. 2 is a schematic diagram of the indication apparatus represented by a block in FIG. 1.

Turning now to FIG. 2, the indicating apparatus 15 is shown coupled to the exposure control circuit terminals 49a and b and includes a manually operated switch 48, which in the first of two selectable positions, conditions the apparatus 15 to indicate whether the scene illumination is at a level which has been determined to be too low to permit suitable film exposure, and in the second position permits the apparatus 15 to determine whether the DC potential of the battery 43 is above a selected level.

The terminal 49a is connected to ground by way of a voltage dividing network comprised of resistors 55 and 56. In accordance with the invention there is provided a first amplifier stage which includes a transistor 50, having its base connected at the junctions of the resistors 55 and 56 and its emitter connected to the terminal 49b. The switch 48 is shown in its first position wherein it connects the collector of the transistor 50 through resistor 57 to the base electrode of a PNP transistor 60 which is disposed in a second amplifier stage. The transistor 60 has its collector electrode connected to ground through the low light indicator lamp and its emitter electrode connected to the battery 43.

During normal operation the voltage difference between the terminals 49a and b will be negligible and the transistor 50 will be in a cut-off condition. However, when the potential level at the terminal 49a becomes positive with respect to the terminal 49b and reaches a selected level determined by the voltage dividing resistive network comprising resistors 55 and 56, the transistor 50 will be driven from cut-off into an active mode of operation.

Returning momentarily to the time when the transistor 50 was nonconductive, there would be no substantial voltage difference between the collective base junctions of the transistor 60, and the transistor 60 would also be in a cut-off mode of operation. However, when the transistor 50 conducts, the transistor 60 will be driven into the active region of operation and a substantial current will flow through the collector emitter path of the transistor 60 which is sufficient to energize the lamp 47 signaling a warning of an unsuitable exposure condition.

To test the battery potential 43, the switch 48 is moved to its second position which open circuits the connection between the collector of the transistor 50 and the base of the transistor 60, and now disposes the base of the transistor 60 at the electrical junction of resistors 64 and 68 which comprise a voltage including network. The resistance elements 64 and 68 are serially connected to the battery 43 and are selected to have values such that the transistor 60 will conduct when the battery 43 has a selected potential level, which is considered necessary for suitable operation of the exposure control apparatus 10. With such a battery potential level, the transistor 60 will be turned on and driven into an active condition sufficient to energize the lamp 47.

Reviewing, the low light indicator lamp 47 is not energized immediately upon the maximum light transmitting capability of objective lens 23 being reached, but is energized only if the ambient light continues to decrease in intensity, and downward movement of diaphragm 21 continues until the scene brightness is at a level which has been determined to be unsuitable for film exposure.

The invention has been described in detail with particular reference to a preferred embodiment thereof, but it will be understood that variations and modifications can be effected within the spirit and scope of the invention.

We claim:

1. In a camera having an objective lens which is adapted to focus an image of an object in a film plane, an exposure control apparatus comprising:
   a. photosensitive means having an electrical parameter which varies as a function of incident illumination;
   b. diaphragm means defining a first aperture disposed in a cooperative relation with the objective lens and a second aperture disposed in a cooperative relation with said photosensitive means, said diaphragm means being
      1. movable along a first portion of a predetermined path to increase the effective size of said first aperture relative to said objective lens from a minimum to a maximum size and increase the effective size of said second aperture relative to said photosensitive means; and
      2. movable along a second portion of said predetermined path to maintain said first aperture at said maximum effective size and to further increase the effective size of said second aperture relative to said photosensitive means; and
   c. means coupled to said diaphragm means and responsive to variations in said parameter to move said diaphragm means along said predetermined path.

2. In a camera having an objective lens which is adapted to focus an image of an object in a film plane, an exposure control apparatus comprising:
   a. photosensitive means having an electrical parameter which varies as a function of the level of incident illumination, a predetermined value of said parameter corresponding to a desired film exposure condition;
   b. diaphragm means defining a first aperture disposed in a cooperative relation with the objective lens and a second aperture disposed in a cooperative relation with said photosensitive means, said diaphragm means being:
      1. movable along a first portion of a predetermined path to increase the effective size of said first aperture relative to said objective lens from a minimum to a maximum size and increase the effective size of said second aperture relative to said photosensitive means, and
      2. movable along a second portion of said predetermined path to maintain said first aperture at said maximum effective size and to further increase the effective size of said second aperture relative to said photosensitive means; and
   c. positioning means coupling said diaphragm means to said photosensitive means and responsive to variations in said parameter from the predetermined value to move said diaphragm means to a position along said predetermined path to adjust the effective size of said second aperture to effect a change in said parameter to said predetermined value.

3. The invention as set forth in claim 2 wherein said diaphragm means includes a plate and each said aperture is at least partially formed in said plate.

4. The invention as set forth in claim 2 wherein said second aperture is contoured to permit said positioning means to maintain a constant illumination level on said photosensitive means.

5. The invention as set forth in claim 4 wherein said second aperture has a substantially triangular configuration and said first aperture has a first portion having a substantially triangular configuration and a second portion contoured to provide said maximum effective size.

6. In a camera having an objective lens which is adapted to focus an image of an object in a film plane, an exposure control apparatus comprising:
   a. photosensitive means having an electrical parameter which varies as a function of the level of incident illumination, a predetermined value of said parameter corresponding to a desired film exposure condition;
   b. diaphragm means defining a first aperture disposed in a cooperative relation with the objective lens and a second aperture disposed in a cooperative relation with said photosensitive means, said diaphragm means being:
      1. movable along a first portion of a predetermined path to increase the effective size of said first aperture relative to said objective lens from a minimum to a maximum size and increase the effective size of said second aperture relative to said photosensitive means, and
      2. movable along a second portion of said path to maintain said first aperture at said maximum effective size and to further increase the effective size of said second aperture relative to said photosensitive means;
   c. first and second windings magnetically coupled to said diaphragm means, said first and second windings being oppositely poled and effective to exert an unbalanced force on said diaphragm means to move said diaphragm means in response to changes in current flow through said first and second windings;
   d. a differential amplifier electrically coupled to said first and second windings and said photosensitive means and adapted to be responsive to variations in said parameter from the predetermined value to vary current through said first and second windings to adjust the effective size of said second aperture to effect a change in said parameter to the predetermined value.

7. In a camera having an objective lens which is adapted to focus an image of an object in a film plane, an exposure control apparatus comprising:
   a. photosensitive means having an electrical parameter which varies as a function of the level of incident illumination, a predetermined value of said parameter corresponding to a desired film exposure condition;
   b. diaphragm means defining a first aperture disposed in a cooperative relation with the objective lens and a second aperture disposed in a cooperative relation with said photosensitive means, said diaphragm means being:
      1. movable along a first portion of a predetermined path to increase the effective size of said first aperture relative to said objective lens from a minimum to a maximum size and increase the effective size of said second aperture relative to said photosensitive means, and
      2. movable along a second portion of said predetermined path to maintain said first aperture at said maximum effective size and to further increase the effective size of said second aperture relative to said photosensitive means until a maximum effective size of said second aperture is reached;
   c. positioning means coupling said diaphragm means to said photosensitive means and responsive to variations in said parameter from the predetermined value to move said diaphragm means to a position along said predetermined path to adjust the effective size of said first aperture to effect a change in said parameter to said predetermined value; and
   d. indicating means coupled to said photosensitive means and after said second aperture has reached said maximum effective size adapted to be responsive to a selected value of said parameter to indicate that scene brightness is unsuitable for film exposure.

8. The invention as set forth in claim 7 wherein said indicating means includes a lamp and means for energizing said lamp in response to said selected parameter value.

9. In a camera having an objective lens which is adapted to focus an image of an object in a film plane, an exposure control apparatus comprising:
   a. photosensitive means having an electrical parameter which varies as a function of the level of incident illumination, a predetermined value of said parameter corresponding to a desired film exposure condition;

b. diaphragm means defining a first aperture disposed in a cooperative relation with the objective lens and a second aperture disposed in a cooperative relation with said photosensitive means, said diaphragm means being:
  1. movable along a first portion of a predetermined path to increase the effective size of said first aperture relative to said objective lens from a minimum to a maximum size and increase the effective size of said second aperture relative to said photosensitive means, and
  2. movable along a second portion of said predetermined path to maintain said first aperture at said minimum effective size and to further increase the effective size of said second aperture relative to said photosensitive means until a maximum effective size of said second aperture is reached;
c. first and second windings magnetically coupled to said diaphragm means, said first and second windings being oppositely poled and effective to exert an unbalanced force on said diaphragm means to move said diaphragm means in response to changes in current flow through said first and second windings;
d. circuitry coupled to said photosensitive means and said first and second windings and adapted to be responsive to variations in parameter from the predetermined value to vary current through said first and second windings to adjust the effective size of said second aperture to effect a change in said parameter to the predetermined value and including means coupled to said photosensitive means and adapted to produce a signal after said second aperture has reached said maximum effective size in response to a selected value of said parameter corresponding to an unsuitable film exposure condition; and
e. indicating means coupled to said signal producing means and responsive to said signal for indicating that said scene illumination is unsuitable for film exposure.

10. The invention as set forth in claim 9 wherein said diaphragm means includes a plate and each said aperture is at least partially formed in said plate.

11. The invention as set forth in claim 9 wherein said second aperture is contoured to permit said positioning means to maintain a constant illumination level on said photosensitive means.

12. The invention as set forth in claim 11 wherein said second aperture has a substantially triangular configuration and said first aperture has a first portion having a substantially triangular configuration and a second portion contoured to provide said maximum effective size.

13. The invention as set forth in claim 12 wherein said indicating means includes a lamp and means for energizing said lamp in response to said selected parameter value.

* * * * *